United States Patent [19]

Walsh

[11] 3,962,028
[45] June 8, 1976

[54] SWEPT SURFACE EVAPORATOR

[75] Inventor: John C. Walsh, Winchester, Mass.

[73] Assignee: The De Laval Separator Company, Poughkeepsie, N.Y.

[22] Filed: Sept. 9, 1974

[21] Appl. No.: 504,072

[52] U.S. Cl. ............................. 159/6 W; 159/13 C
[51] Int. Cl.² ........................................... B01D 1/22
[58] Field of Search ................. 159/6 W, 6 R, 27 A, 159/13 C, 14, 49; 202/236; 203/89

[56] References Cited
UNITED STATES PATENTS

| | | | |
|---|---|---|---|
| 1,406,055 | 2/1922 | Merrell | 159/6 W |
| 2,199,320 | 4/1940 | LeJuge | 159/27 A |
| 2,367,215 | 1/1945 | House | 159/27 A |
| 2,774,415 | 12/1956 | Belcher | 159/6 W |
| 2,866,499 | 12/1958 | Haley | 159/6 W |
| 2,954,821 | 10/1960 | Baumann et al. | 159/27 A |
| 3,572,415 | 3/1971 | Voncken | 159/6 W |
| 3,678,983 | 7/1972 | Widmer et al. | 159/6 W |

*Primary Examiner*—Jack Sofer
*Attorney, Agent, or Firm*—Cyrus S. Hapgood

[57] ABSTRACT

The material to be evaporated is continuously fed into a stationary vertical cylinder where it is heated to a boiling condition through the cylinder wall while scraping material from said wall and while rotating the material about a vertical axis to maintain an upwardly opening cavity therein. Vapors drawn from the cavity to concentrate the material are passed through a first path; and concentrated material is displaced through a second path along part of the cylindrical surface while in a cooled condition to arrest the boiling and while maintaining the two paths separated. The discharge pressure of the concentrated material is increased by imposing a substantial resistance to its rotation in the second path; and to permit control of the evaporation, a sensing device is inserted in the second path to indicate changes in the temperature of the discharging concentrated material, which is substantially free of vapor.

5 Claims, 4 Drawing Figures

SWEPT SURFACE EVAPORATOR

This invention relates to the concentration of materials by evaporation and more particularly to a novel evaporating method and apparatus utilizing a swept surface through which the material is heated to a boiling condition.

The removal of water or other fluids from chemicals and foodstuffs is a common practice. Major reasons for reducing the fluid content are to reduce shipping and container charges, or to increase the keeping qualities of a foodstuff, or to prepare a material for spray drying. The commercial evaporator commonly used to remove fluids from materials is made up of shell and tube designs, vertically mounted with various means for introducing and guiding the flow of product down the inside diameter of the tubes, there being many such tubes. Steam is admitted to the area on the outer diameter of the tubes, usually steam at low or medium pressure and temperature to prevent burn-on of the food or chemical product within the tubes, which would impair the heat exchange function. More particularly, food materials containing protein are subject to burn-on, and such materials are also subject to heat damage as in the coagulation of protein, so that steam temperatures must be kept low (as below 140° F for half an hour or 160° F for 18 seconds) to prevent fouling the heat exchange surface or damaging the product. Also, in many chemical products reducing the fluid percentage may cause the dissolved solids to precipitate and the precipitate may cling to the tube, interfering with the heat transfer and plugging the tube.

Evaporators described above are limited in the extent of the concentration they can reach. As the concentration of most products increases, their viscosity also increases. This reduces the heat exchange rate, and a compromise must be made between evaporation area and throughout rate to make the process feasible. Indeed, the increased product viscosity may even cause the evaporator to fail. Similarly, the presence of a large proportion of precipitate may cause the evaporator to fail.

Typically, the best commercial falling film evaporators can condense milk to 40% solids, whey to 55% solids, tomato juice from 6% to 36% solids, peach juice from 12% to 32% solids, coffee from 17% to 60% solids, and grape juice from 13% to 28% solids.

The evaporator of the present invention operates in such a manner as to greatly reduce the known deleterious effects of increased viscosity and in fact, for ordinary uses and products, to eliminate these effects of increased viscosity, as well as to eliminate the adverse effect of solids crystallizing out on the heat exchange surface. Further, the new evaporator operates at heat exchange rates many times greater than the falling film evaporator because the layer of material to be condensed is rapidly and continuously scraped from the heat exchanger surface by precisely fitted blades revolving against and scraping the heat exchange surface.

According to the present invention, the material to be concentrated is fed to a heating zone formed by a stationary vertical cylinder, where the material is heated through the cylinder wall to a boiling condition while scraping material from this wall and while rotating the material about a vertical axis to maintain an upwardly opening cavity in the material. This cavity provides a relatively large surface area from which vapors are emitted, and it also forms a relatively clear passage through which the vapors are drawn by vacuum or otherwise pass to a first discharge path. For simple evaporation where close control of the final product is unnecessary, the steam temperature in the heat exchange annulus can be selected to provide a constant heat exchange effect, as in concentrating a chemical mixture to a sludge for easy disposal.

When close control of the final product is desired, a second discharge path is preferably provided which extends along part of the cylinder wall and through which the concentrated material is displaced while separated by guide means from the vapors discharging through the first path. The concentrated material no longer boils as it passes through the second discharge path. Thus, since the material is substantially free of vapors as it discharges through this second path, the latter is an ideal location for the sensing element of a temperature indicator used to control the evaporating operation.

In the preferred construction, the aforementioned vertical cylinder is surrounded by an outer vertical cylinder to form an annular heating space for receiving a heating medium such as steam. Preferably, the guide means include an annular member containing the first path for vapor discharge and mounted within the upper end portion of the inner cylinder to define therewith the second path in annular form for discharging the concentrated material, the guide means also including radial fins located in this second path for reducing rotation of the discharging concentrated material and thereby increasing its discharge pressure.

For a more complete understanding of the invention, reference may be had to the following description in conjunction with the accompanying drawings, in which.

Figure 1:
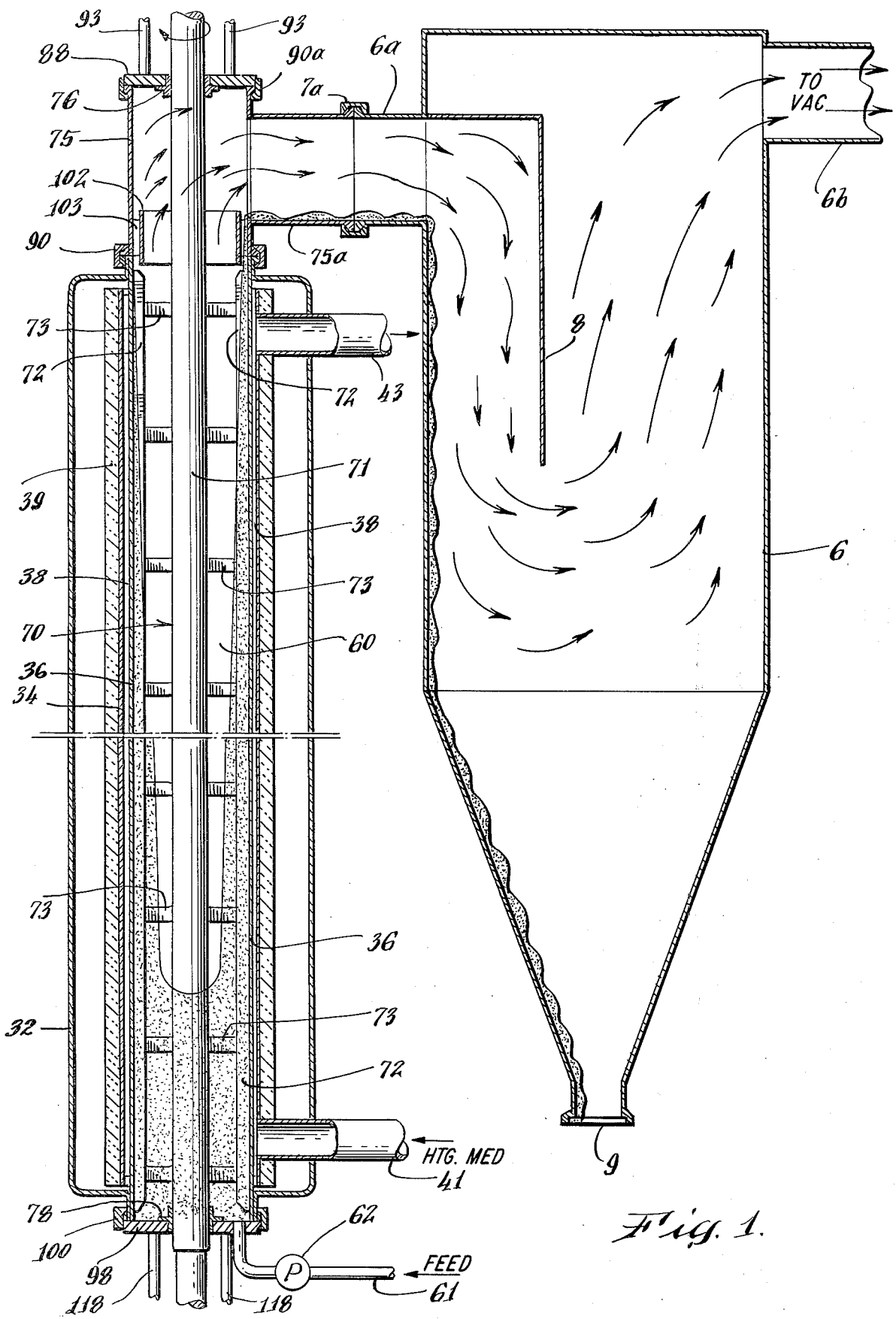
FIG. 1 is a vertical sectional view of a preferred form of the new apparatus, showing the disposition and flow of the material therein during operation.

The apparatus as illustrated comprises a cylindrical outer jacket 32 supported in any suitable manner and which may be made of stainless steel. Mounted within the outer jacket 32 is an annular outer cylinder 34 and an inner cylinder 36 positioned approximately concentrically with the outer cylinder. An annular space 38 is therefore formed between the outer cylinder 34 and the inner cylinder 36, this space serving as a chamber for receiving a heating medium. A layer of heat insulating material 39 is usually provided on the outer surface of the outer cylinder 34. The annular space 38 communicates with a lower duct 41 and an upper duct 43, one of these ducts serving as an inlet and the other as an outlet of the heating medium, such as steam.

Rotatably mounted within the inner cylinder 36 is a rotor assembly indicated generally at 70 and comprising a vertical rotor shaft 71. Radially extending blade pins 73 are affixed to the rotor shaft 71, and each vertical row of these pins supports a wiper blade 72 which engages the inner surface of the inner cylinder 36. As the assembly 70 rotates, the blades 72 continuously scrape the inner surface of cylinder 36 free of any product that adheres thereto. For products of relatively low viscosity, the rotor assembly may be provided with paddles or blades which trail in such a manner as to nearly scrape the inner surface so as to avoid possible wear on the parts.

The inner cylinder 36 is provided with a lower end plate 98 which is secured to this cylinder by a releasable clamp 100. The rotor shaft 71 extends downwardly through a bushing 78 mounted in the end plate 98. The inner cylinder 36 is also provided with an upper extension 75 secured to this cylinder by a releasable clamp 90; and the upper end of extension 75 is provided with an end plate 88, which is releasably secured to this extension by a clamp 90a. The rotor shaft 71 extends upwardly through a bushing 76 mounted in the upper end plate 88.

Vertical spacer pins 93 are welded to the top of upper end plate 88 and serve to support an upper head assembly (not shown) for driving the rotor shaft 70. The drive for this shaft may include a hydraulic motor arranged as disclosed in Pat. No. 3,633,664 granted Jan. 11, 1972, in the names of John C. Walsh and James A. D'Orsay and entitled "Vertically Oriented Swept Surface Heat Exchanger".

The lower end plate 98 has a plurality of spacer pins 118 welded thereto and forming part of a lower head assembly for supporting the lower end of rotor shaft 71 in a suitable bearing (not shown). This lower head assembly may be arranged as disclosed in said Pat. No. 3,633,664.

It will be apparent that the inner cylinder 36 defines a central chamber 60 which is closed at the bottom by the lower end plate 98. The material to be concentrated is fed to this chamber through an inlet provided by a supply duct 61. The duct 61 communicates with an inlet opening in the lower end plate 98 and delivers the material under pressure by means of a pump 62.

The cylinder extension 75 has a lateral outlet duct 75a which communicates with a discharge vessel 6. More particularly, the vessel 6 has at its upper portion an inlet fitting 6a to connect it to the duct 75a by a releasable clamp 7a. The vapors entering the vessel 6 are deflected downwardly by a baffle 8 and discharged through a suction pipe 6b leading from the upper portion of vessel 6. The lateral duct 75a forms an overflow outlet for discharge of the concentrated material from chamber 60, and this material flows downwardly along the wall of vessel 6 to a bottom outlet 9, as shown particularly in FIG. 1.

Figure 3:
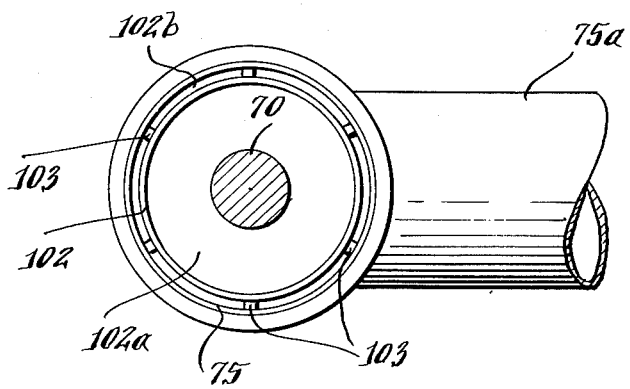
FIG. 3 is a sectional view on line 3—3 in FIG. 2.

Located at the upper portion of chamber 60 are guide means comprising an annular member 102 forming an inner passage 102a for discharging vapors to the suction line 6b. The annular member 102 is disposed within and spaced from the inner cylinder extension 75 in concentric relation thereto, thereby forming a generally annular outlet 102b as shown in FIG. 3, this outlet serving for discharge of concentrated material from chamber 60. The guide means also include substantially radial fins 103 which interconnect the annular member 102 and the inner surface of cylinder extension 75, thereby supporting the annular member in this extension. The fins 103 are thus located in the annular discharge passage 102b and serve to arrest rotation of the concentrated material as it discharges through this passage, thereby increasing the discharge pressure of this material by converting velocity head to pressure head.

Figure 4:
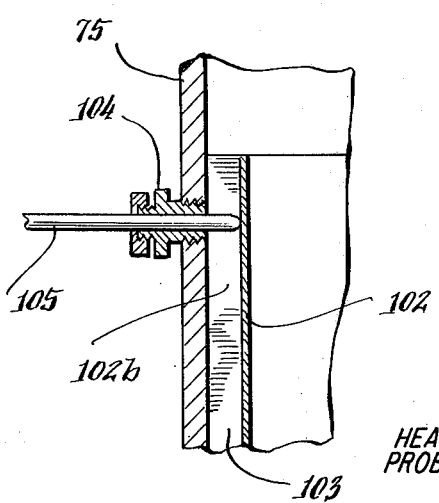
FIG. 4 is a detail view of part of the apparatus, showing the location of the temperature sensing element.
Figure 2:
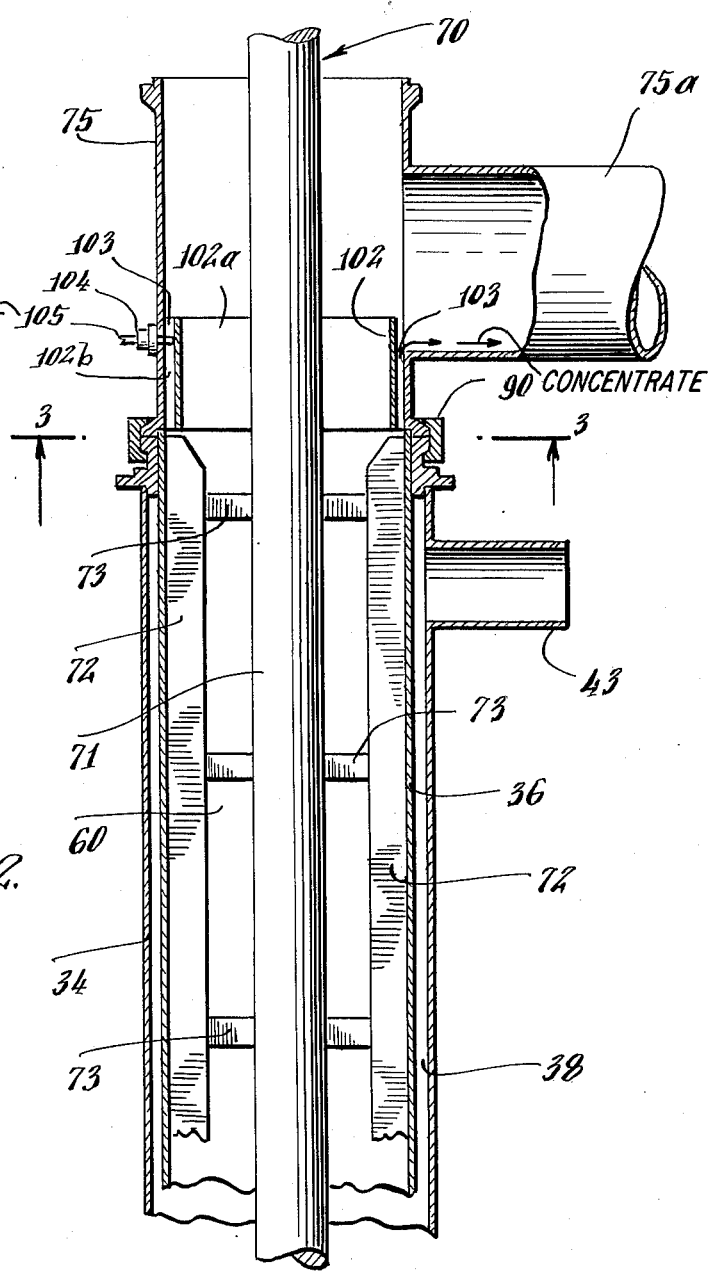
FIG. 2 is an enlarged vertical sectional view of part of the apparatus shown in FIG. 1.

The cylinder extension 75 is provided with a fitting 104 communicating with the annular passage 102b. A heat sensing element 105 (FIG. 4) extends through this fitting into the passage 103 and forms part of a device for indicating changes in the temperature of the concentrated material discharging through passage 102b.

It will be observed that the final flow through the annular outer passage 102b is substantially free of vapor, since essentially all of the vapor discharges through the central or inner passage 102a. For this reason, it is particularly advantageous that the temperature indicator 105 be immersed in the flow through outer passage 102b. For most products, the temperature of the vapor from the product at any given pressure is not the same value as the boiling point of the product. For example, a solution of 90% sugar and 10% water at atmospheric pressure boils at about 240° F, but the vapor temperature is 212° F. Thus, the temperature indicating bulb 105 must not be immersed in any significant amount of vapor if it is to provide an effective control point.

In the present apparatus, the guide means 102-103 not only provide the essentially vapor-free passage 102b for the control point but also remove the swirling motion from the concentrated product as it reaches the discharge point. This serves to prevent splashing and uneven movement at the exit point of the finished product. It is noteworthy, too, that the apparatus can be operated vertically while feeding from the top instead of the bottom, since the vapors may escape by flowing downward to the condensing means.

It will be understood that the temperature indicator 105 can be used for controlling the evaporation to provide an efficient operation, as by regulating the rate at which the product is supplied by feed pump 62 and/or by regulating the temperature of the heating medium supplied to the annular space 38. With the present evaporator thus controlled, it can carry final solids in whey from 55% to 90%, condensed milk from 33% to 50%, tomato juice from 35% to 60% solids, peach juice from 32% to 45%, coffee from 60% to 85% solids, grape juice from 20% to 85% solids, etc.

The heat exchange part of the present evaporator is essentially the same as that disclosed in the aforementioned Pat. No. 3,633,664. In the present evaporator, and according to that patent, the product feed stream enters at the bottom of the inner cylinder and is put into rotation by the scraper blades 72 of the rotor assembly. These blades impart spin to the product and also effect rapid removal of the viscous material from the heat exchange walls, the material thus removed being instantly thrown back upon the cylinder walls by the velocity head imparted to the product, whereby a rapid heat exchange is obtained. The smooth, hard surfaces of the cylinder walls are swept by the precisely fitted scraper blades 72 so that no part of the product can be kept on the surfaces long enough to burn on. The latter is important to the operation because it allows the temperature of the heating medium to be much greater than in the falling film evaporator, thereby enabling much greater temperature differences between heating medium and product. Also, crystalline materials formed on the heat exchange surface are immediately swept clear and are removed along with the discharging concentrated mass.

It is important that the vapor have a relatively clear path to the condenser, and this path is provided in part by the upwardly opening cavity formed in the product mass by the rotation thereof, as shown in FIG. 1.

The annular heating space 38 terminates at its upper end well below the discharge passage 102b, whereby the concentrated material is held sufficiently so that it no longer boils as it discharges through this passage. The scraper blades 72 sweep the entire heat exchange area surrounded by heating chamber 38 and extend upwardly beyond this area so as to scrape the inner cylinder 36 over its unheated area leading to the discharge passage 102b. If desired, the guide means 102-103 may be arranged for vertical adjustment to vary its spacing from the upper ends of the scraper blades.

During operation of the feed pump 62 and the rotor assembly 70, the rotating feed product is continuously displaced upwardly in chamber 60 while maintaining the generally conical cavity shown in FIG. 1. As it rises from the bottom of this cavity while in a boiling condition from the heat exchange, the product becomes more concentrated due to its loss of vapors which are continuously evolved from the surface of the cavity and are drawn rapidly through the central discharge passage 102a on their way to the suction pipe 6b. The product concentrated to the desired solids content, and no longer boiling, discharges through the annular outlet 102b if used while substantially filling this outlet to prevent splashing and bubbling of the product. The structure serves to limit or eliminate liquid carry-over to the condenser by way of suction pipe 6b and provides a locus 102b for a temperature sensing device immersed in the final product.

Due to the velocity head imparted to the product by the rotating blades 72, and the conversion of velocity head to pressure head by the fins 103, the finished product rises under a substantial pressure head through annular passage 102b to the overflow outlet formed by lateral duct 75a, from which it flows downwardly in vessel 6 to the outlet 9 and thence to atmosphere or to a suction line (not shown).

I claim:

1. A swept surface evaporator comprising a vertical inner cylinder partly defining a chamber having an inlet at its lower portion for a material to be concentrated, pump means for delivering the material to said inlet, a vertical outer cylinder surrounding the inner cylinder and forming therewith a generally annular heating space for receiving a heating medium, means for rotating said material about a vertical axis in said chamber to form an upwardly opening cavity in the material, said rotating means including a rotor mounted for rotation on a vertical axis and having blade means for sweeping the inner surface of the inner cylinder, a suction line communicating with said chamber for drawing vapors from said cavity, said inner cylinder having an upward extension projecting above the top level of said blade means and heating space and forming an overflow outlet for concentrated material, and a fixed annular guide member located at the upper portion of said chamber within said extension and having a lower end substantially below the level of said overflow outlet, said guide member forming an inner passageway for discharging vapors to said suction line and forming with said extension an outer annular passage separate from said inner passage, said outer annular passageway leading upwardly to said overflow outlet.

2. The evaporator of claim 1, said guide member including substantially vertical radial fins located in said outer passage for reducing rotation of said concentrated material and thereby increasing the discharge pressure thereof.

3. The evaporator of claim 1, comprising also a device for sensing temperature changes and including a sensing element located in said outer passageway.

4. The evaporator of claim 1, in which said guide means also include devices in said outer passage for reducing rotation of said concentrated material and thereby increasing the discharge pressure thereof.

5. The evaporator of claim 1, comprising also a collecting vessel having a bottom outlet for said concentrated material and an upper inlet from which said suction line leads, and a duct leading laterally from said overflow outlet and from said inner passage into said vessel.

* * * * *